United States Patent
Oribe et al.

(10) Patent No.: US 7,412,558 B2
(45) Date of Patent: Aug. 12, 2008

(54) SEMICONDUCTOR STORAGE DEVICE

(75) Inventors: Hiromichi Oribe, Aichi (JP); Yuji Oishi, Aichi (JP); Kimitoshi Nakamura, Aichi (JP)

(73) Assignee: Hagiwara Sys-Com Co., Ltd., Aichi (JP)

( * ) Notice: Subject to any disclaimer, the term of this patent is extended or adjusted under 35 U.S.C. 154(b) by 722 days.

(21) Appl. No.: 10/911,734

(22) Filed: Aug. 5, 2004

(65) Prior Publication Data

US 2006/0015676 A1 Jan. 19, 2006

(30) Foreign Application Priority Data

Jul. 15, 2004 (JP) .............................. 2004-209154

(51) Int. Cl.
*G06F 12/00* (2006.01)

(52) U.S. Cl. ..................................... 711/103
(58) Field of Classification Search ................ 711/112, 711/103
See application file for complete search history.

(56) References Cited

U.S. PATENT DOCUMENTS

| | | | |
|---|---|---|---|
| 5,297,148 A | 3/1994 | Harari et al. | |
| 5,465,338 A * | 11/1995 | Clay | 710/316 |
| 5,559,956 A | 9/1996 | Sukegawa | |
| 5,602,987 A | 2/1997 | Harari et al. | |
| 5,737,742 A | 4/1998 | Achiwa et al. | |
| 6,081,447 A | 6/2000 | Lofgren et al. | |
| 6,130,837 A | 10/2000 | Yamagami et al. | |
| 6,134,143 A * | 10/2000 | Norman | 365/185.09 |
| 6,149,316 A | 11/2000 | Harari et al. | |
| 6,230,233 B1 | 5/2001 | Lofgren et al. | |
| 6,381,662 B1 * | 4/2002 | Harari et al. | 710/301 |
| 6,594,183 B1 | 7/2003 | Lofgren et al. | |
| 2005/0251609 A1* | 11/2005 | Chou et al. | 710/313 |

* cited by examiner

*Primary Examiner*—Hiep T. Nguyen
(74) *Attorney, Agent, or Firm*—Lowe Hauptman Ham & Berner LLP

(57) ABSTRACT

Card-type memories have a memory unit with an area having a minimum memory capacity and a control unit for interpreting a command issued by a host system and controlling the memory unit in accordance with the command. The memory area is formatted in accordance with the universal disk format so each sector of the area has a user data area of 2048 bytes with a logical sector length of 2048 bytes. File management is performed by a UDF file system of a host computer.

31 Claims, 8 Drawing Sheets

[FIG.1]
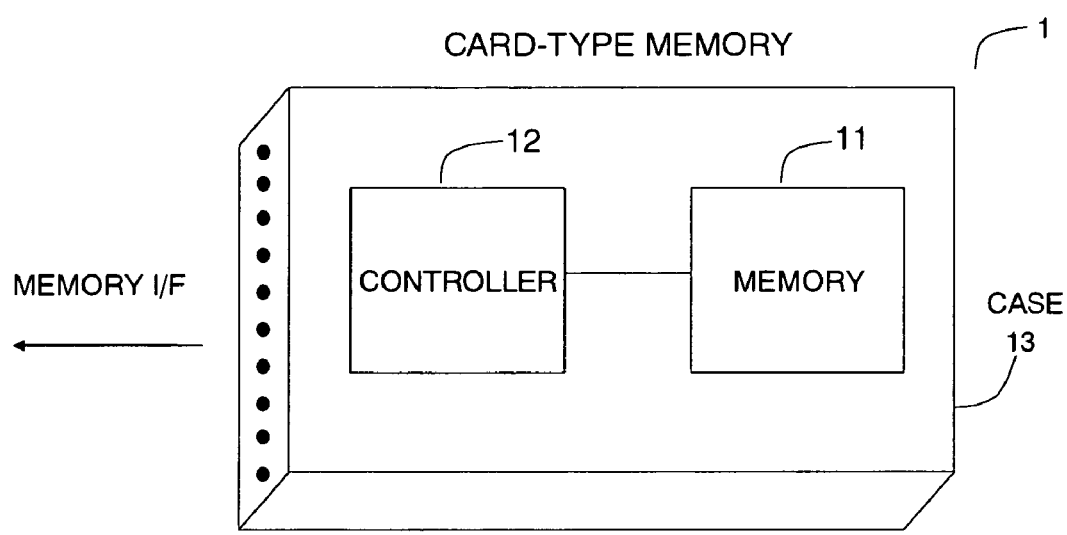

[FIG.2]
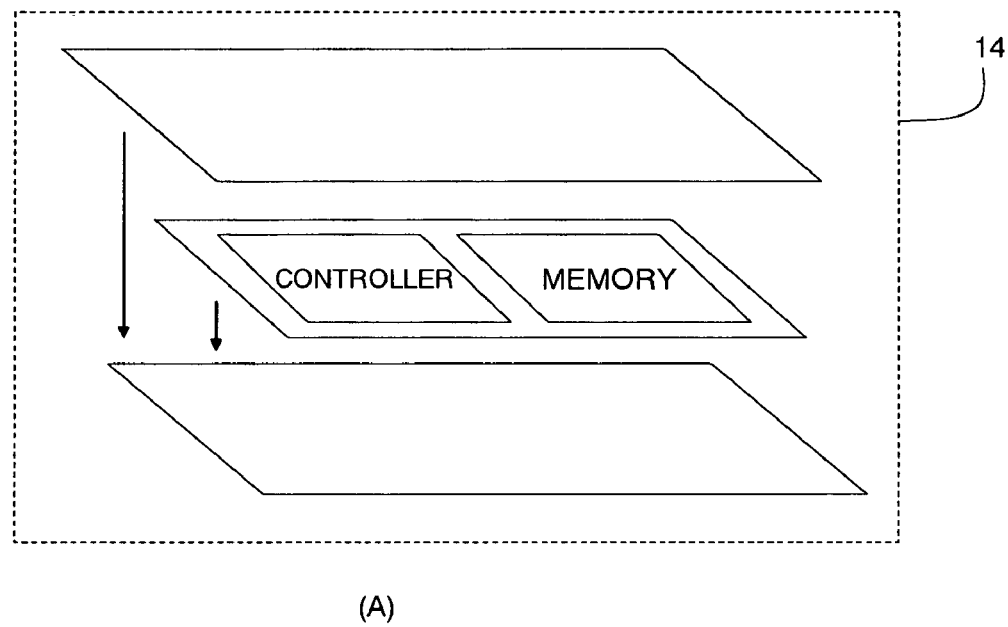
(A)
CARD-TYPE MEMORY
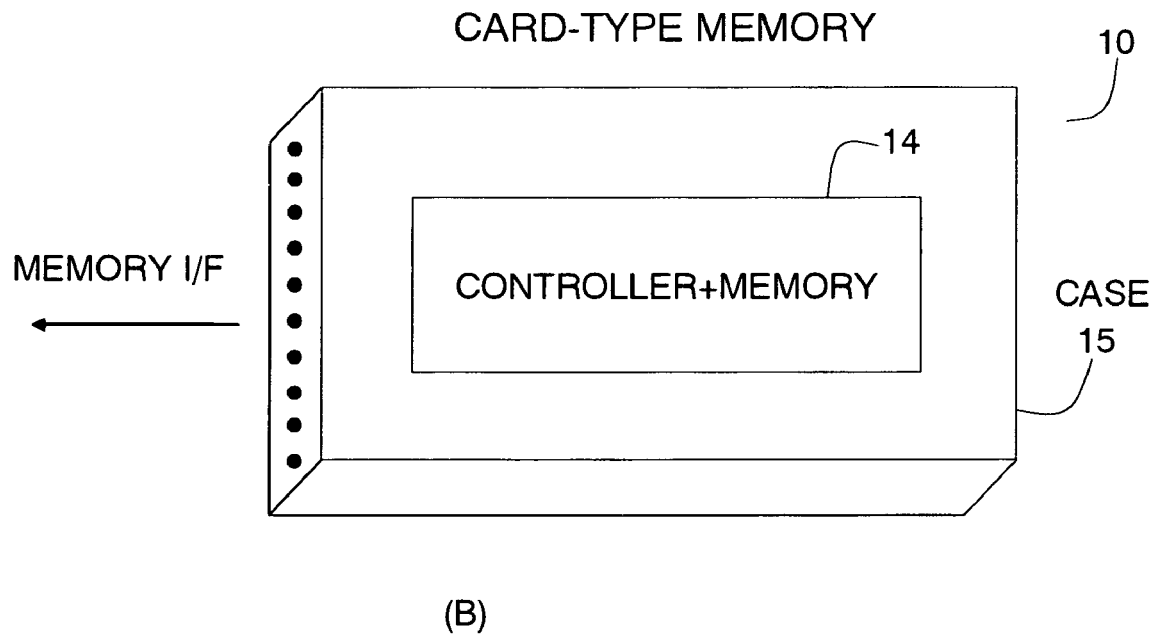
(B)

[FIG.3]
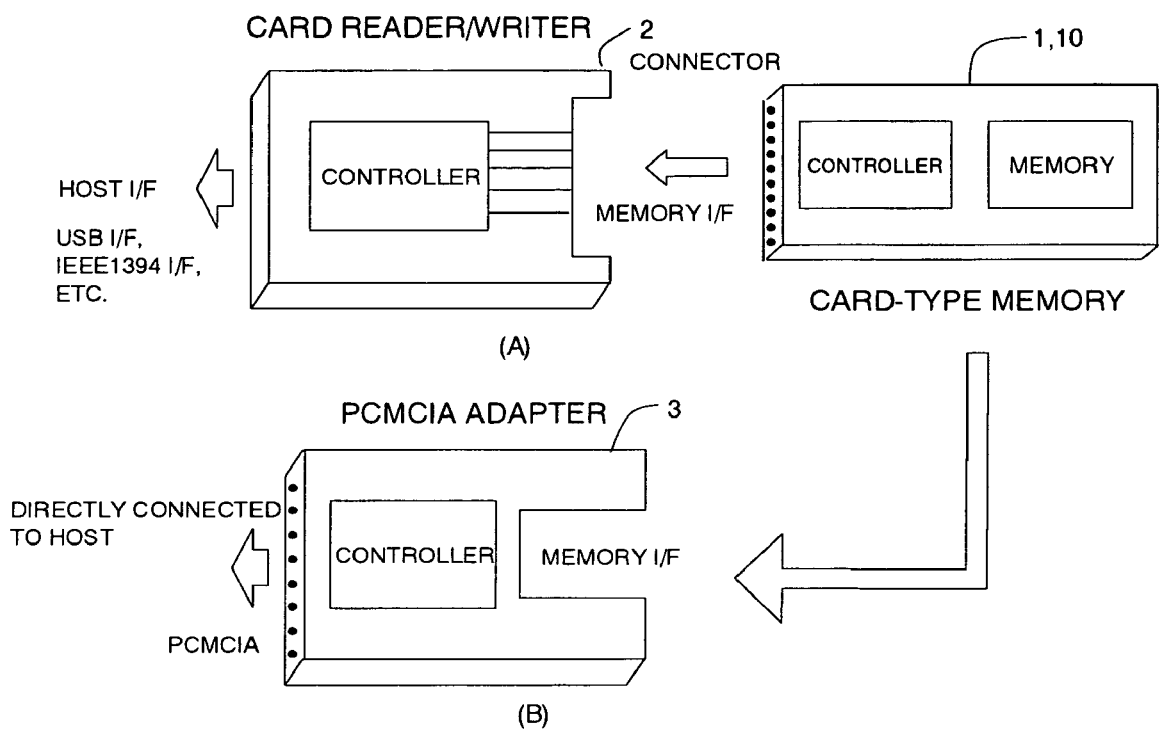

[FIG.4]
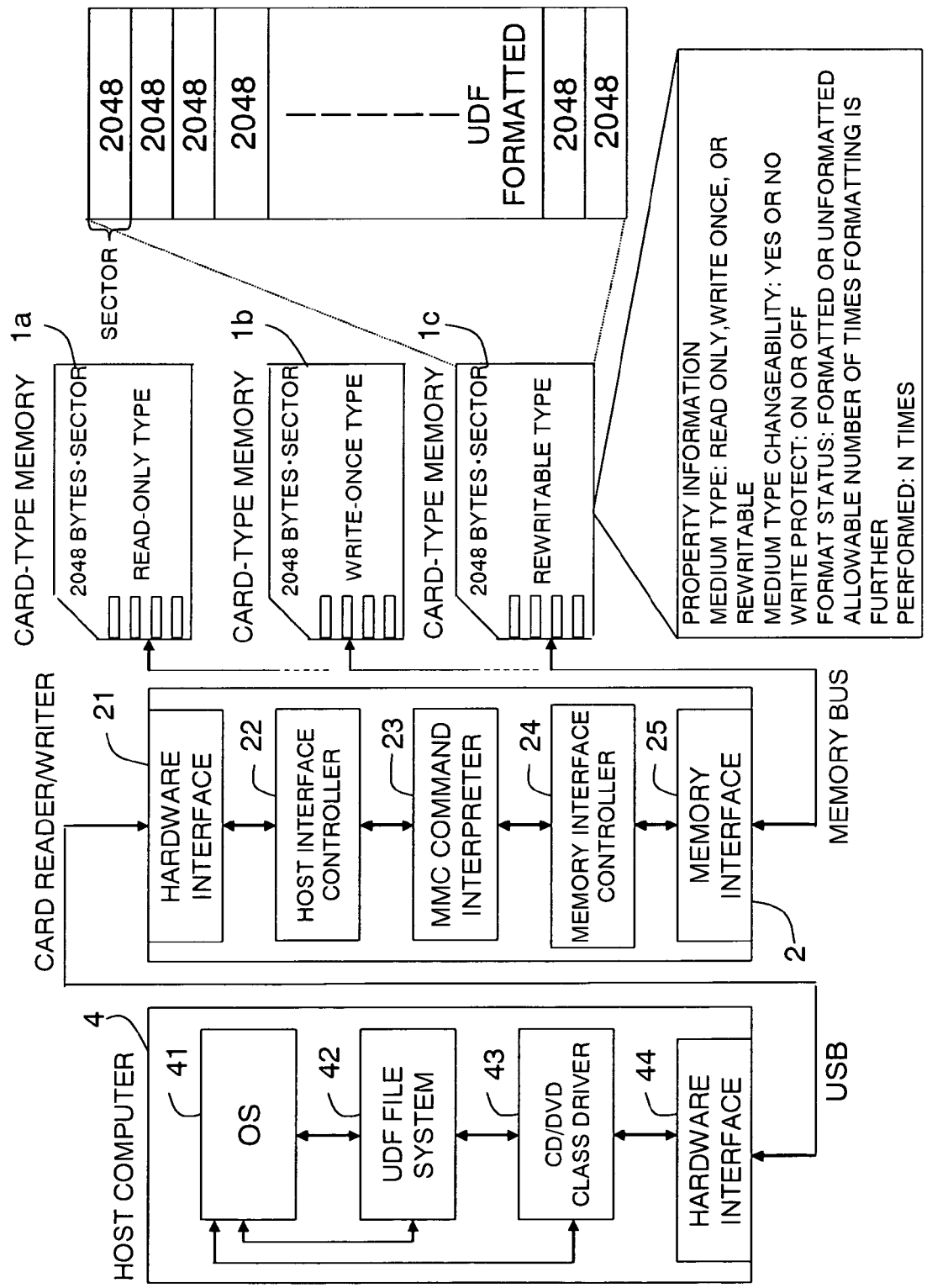

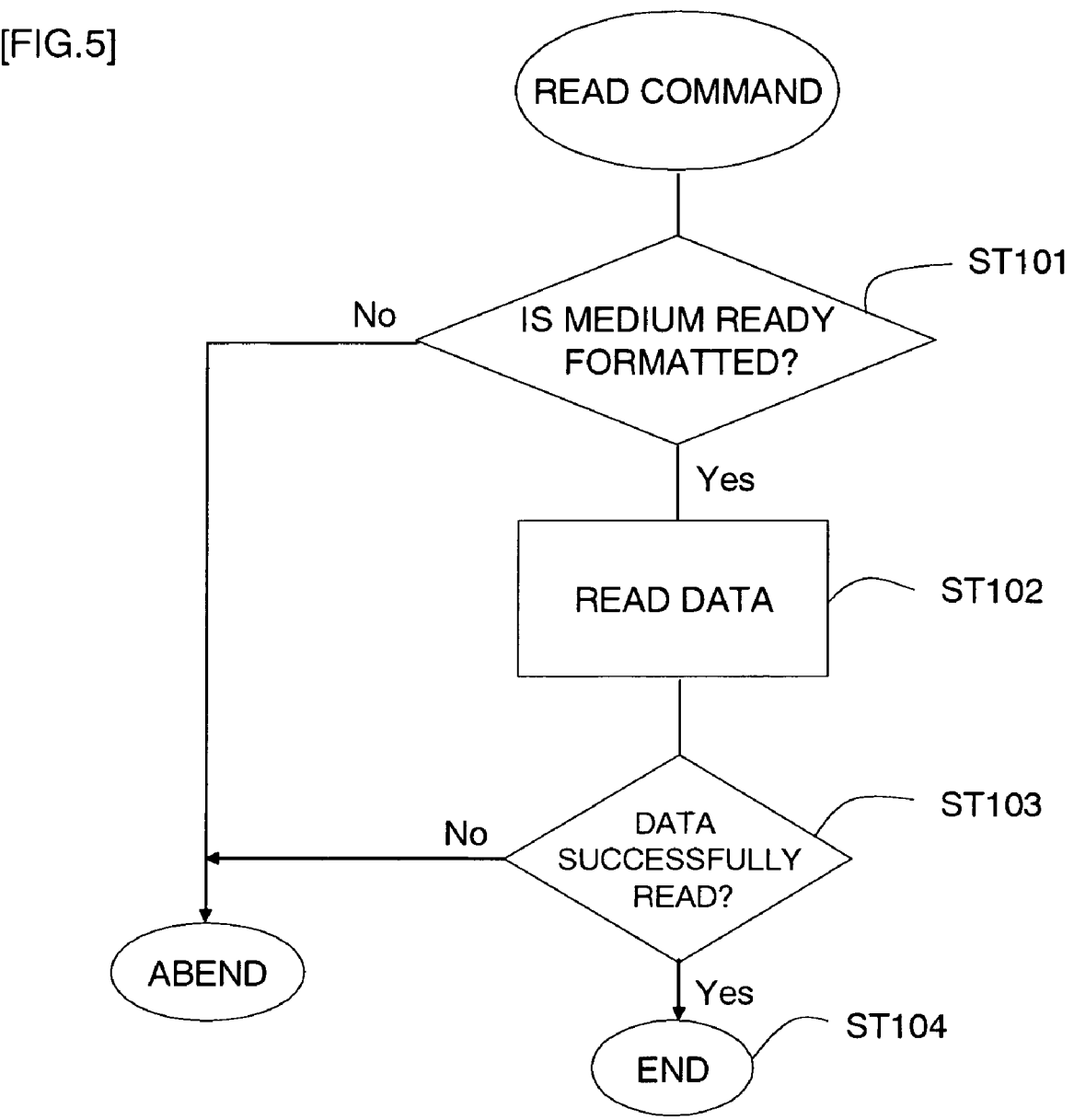
[FIG.5]

[FIG.6]
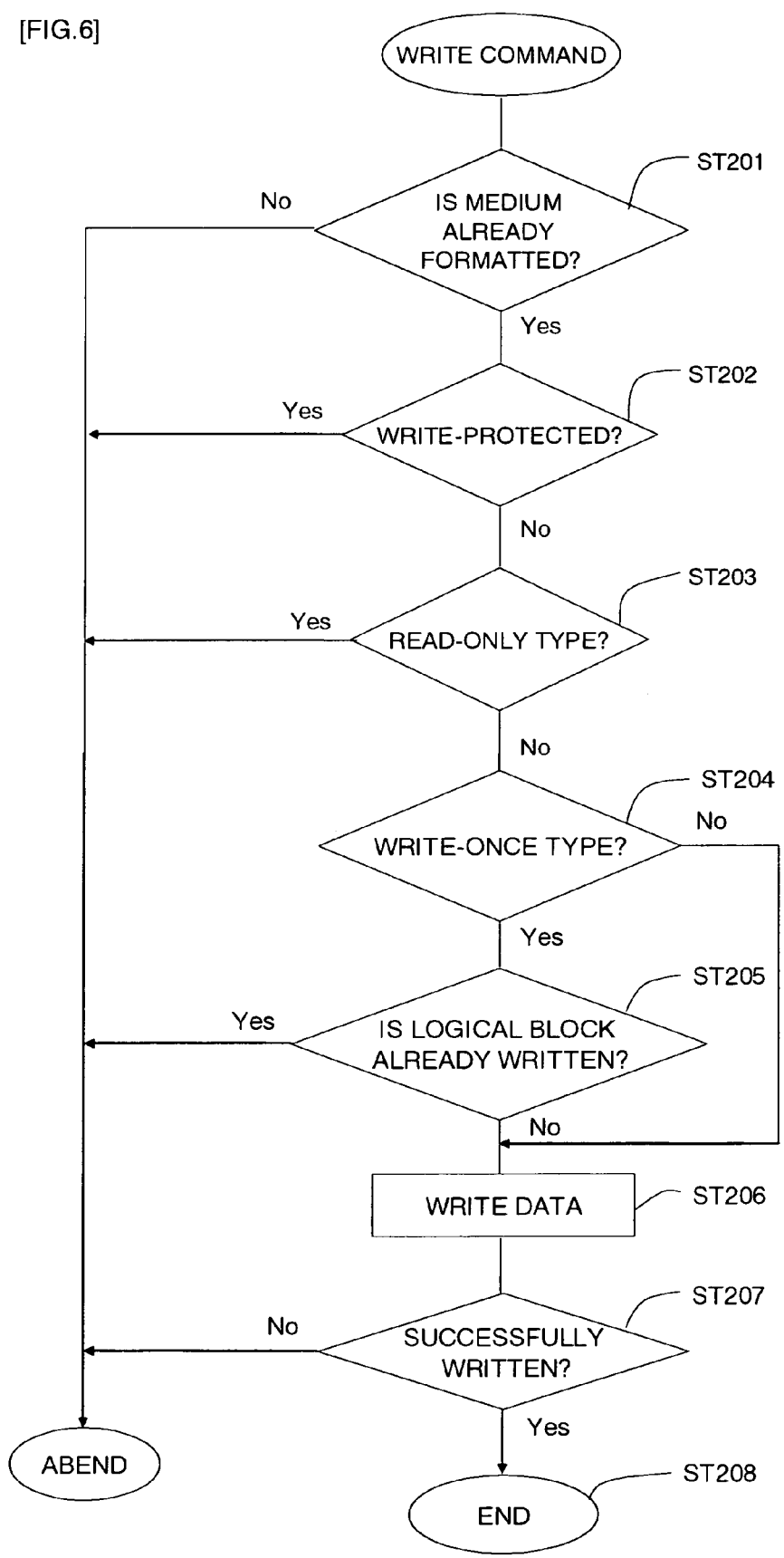

[FIG.7]
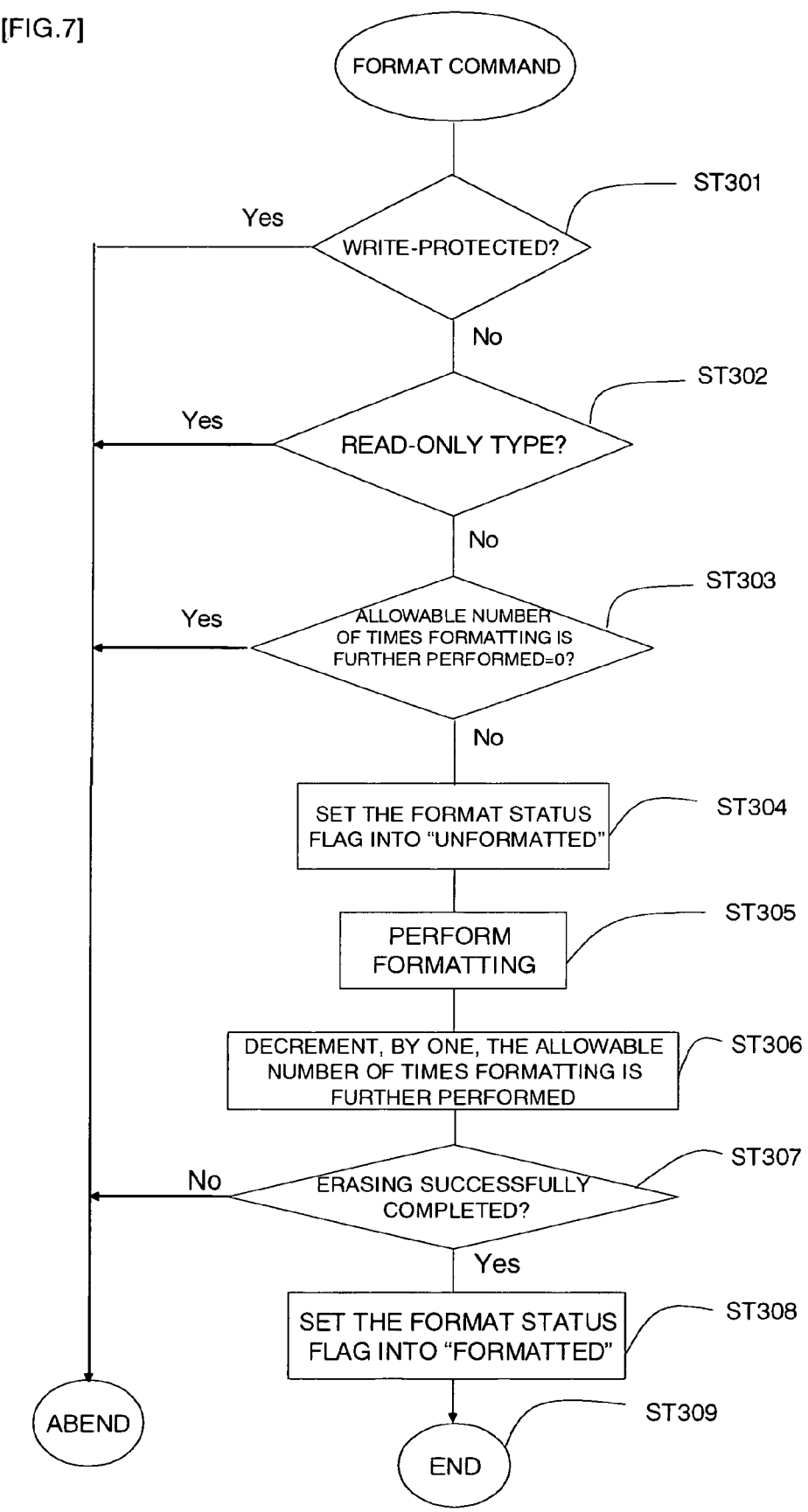

[FIG.8]
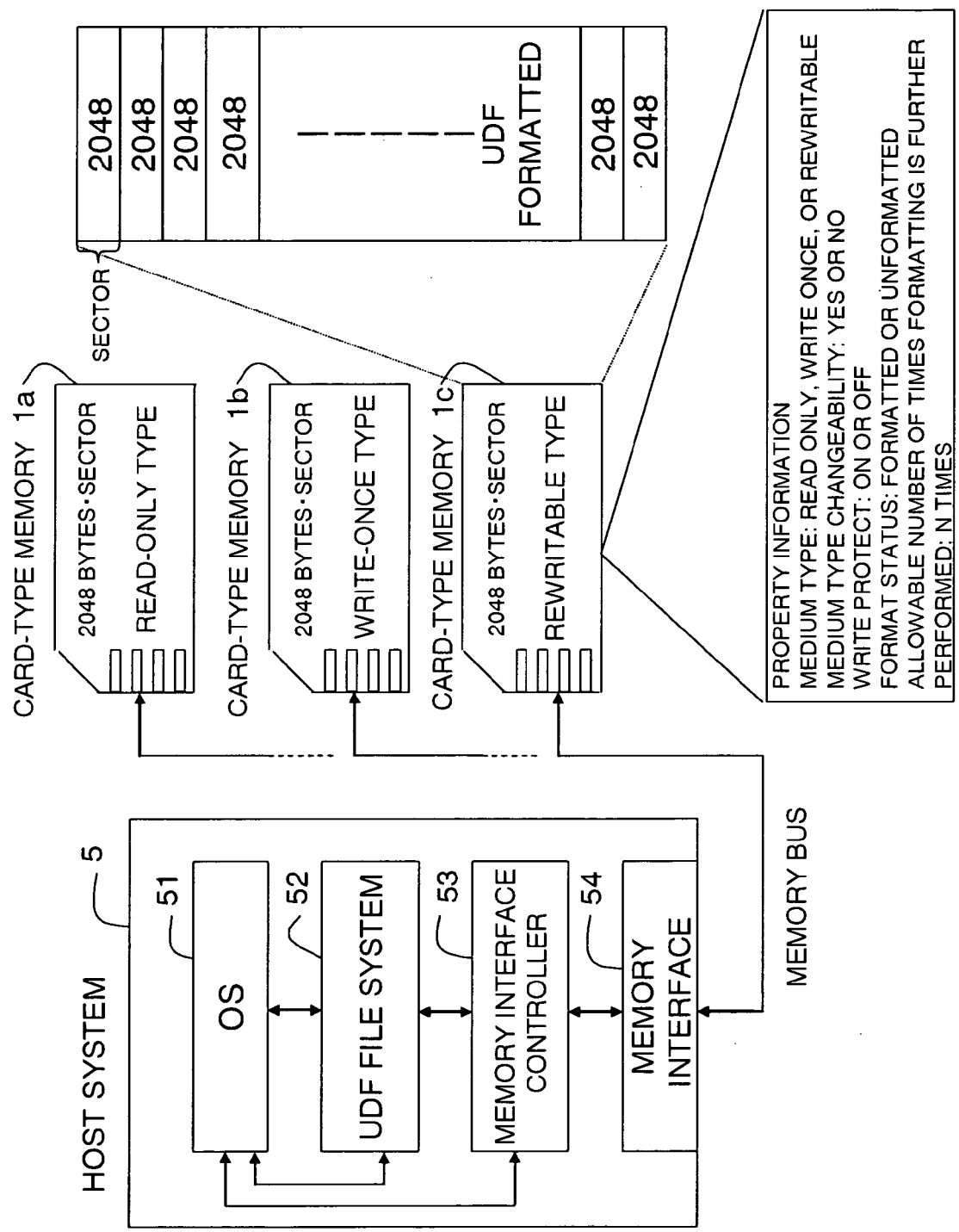

SEMICONDUCTOR STORAGE DEVICE

FIELD OF THE INVENTION

The present invention relates to a storage device for storing information using a semiconductor memory, particularly, to a semiconductor storage device including a storage device and a controller (control unit) for controlling the storage device.

BACKGROUND ART

In computer systems, magnetic disk devices (such as an HDD and an FDD) and optical disk devices (such as an MO, CD, and DVD) are widely used to store data. However, those disk devices are large in volume and weight and consume large amounts of electric power. Furthermore, disk devices are precision machines that are very sensitive to mechanical vibrations or shocks. Therefore, disk devices are unsuitable for use as storage devices in information devices that are small in size, weight, and power consumption.

In recent years, to solve the above problems, semiconductor storage devices using a nonvolatile memory have been developed. The semiconductor storage device is a storage device using a flash EEPROM that is one type of non-volatile memory and that allows all data to be electrically erased, and the semiconductor storage device can be used in an interface similar to that used for conventional magnetic disk devices. Thus, the conventional magnetic disk device can be replaced by the semiconductor storage device.

Specific examples of semiconductor storage devices include an SD card, a COMPACT FLASH (registered trademark), a MEMORY STICK (registered trademark), SMART MEDIA (registered trademark), an xD-PICTURE CARD (registered trademark), and a USB memory used in a state in which it is inserted in a USB port of a host system.

Unlike magnetic disk devices or optical disk devices, semiconductor storage devices have no mechanical moving parts for performing a storing or reading operation. Thus, semiconductor storage devices are suitable for use in information devices having small size, weight, and power consumption. Because of the above-described advantages, the semiconductor storage devices can be loaded on information devices such as a digital camera, a digital video camera, or a portable telephone, to store image data, data received from a computer, or audio data. The data stored in the semiconductor storage device can be reproduced using proper devices.

Flash memories have a lifetime determined by the number of times rewriting/erasing is performed. In flash memories, writing of data is not allowed unless a memory area specified to be used to write data has already been erased. If rewriting/erasing is performed the maximum allowable number of times, which is in the range of 10,000 to 1000,000, it becomes impossible to continue using the flash memory. The tendency in recent years has been to reduce the number of times rewriting/erasing can be performed. To use the flash memory in a more useful manner, it is necessary to develop a way of reducing the number of times rewriting/erasing is performed or develop a new framework wherein flash memories are used as consumables.

In this regard, conventional semiconductor storage devices are used via an interface compatible with a conventional magnetic disk interface, and are dealt with by using a storage device that allows data to be randomly read and written in the same units as the magnetic disk sectors. Such an arrangement requires complicated processing associated with memory control. An effective method of reducing the number of times writing/erasing is performed is not known.

On the other hand, DVDs include various types of semiconductor memory devices such as a read-only type, a write-once type, and a rewritable type. In the write once type, data is written without rewriting physical blocks. If data is written until a memory space becomes full, it is not possible to either write additional data nor delete existing data to create a blank memory space to rewrite data (that is, write-once DVDs are consumables that are not rewritable). Low price DVDs can be used as archive memories for archiving data. Except for DVDs, semiconductor storage of various types, such a the read-only type, write-once type, and rewritable type, are not available at present.

In view of the above-described problems, it is a first object of the present invention to provide various types of semiconductor storage devices, such as the read-only type, the write-once type, and the rewritable type that can be used by a host system by using an existing command set or interface without needing any modification. A second object is to provide semiconductor storage devices of various types such as the read-only type, the write-once type, and the rewritable type using a semiconductor memory with the same structure. A third object is to provide a semiconductor storage device of the rewritable type in which intensive writing or erasing of data in one or more particular memory areas is prevented, thereby achieving a long lifetime. A fourth object is to provide a high-convenience semiconductor storage device of the write-once type that can be initialized when the memory capacity becomes full such that writing of data is again allowed until a blank memory area created by initialization becomes full. Although this semiconductor storage device is not of the write-once type in a strict sense, this semiconductor storage device is also referred to as a semiconductor storage device of the write-once type.

SUMMARY OF THE INVENTION

A first aspect of the present invention relates to a semiconductor storage device usable by a host system having a particular operating system, a UDF file system, a memory interface controller, and a memory interface, wherein the semiconductor storage device includes a memory unit having a memory area with at least a predetermined memory capacity and a control unit for interpreting a command issued by the host system and controlling the memory unit in accordance with the command. The semiconductor storage device stores property information indicating type of the semiconductor device, such as a read-only type, a write-once type, or a rewritable type. The control unit interprets a property read command issued by the host system, executes the command, and returns the property information to the host system, in any device type. The memory area is formatted in accordance with the universal disk format (UDF) such that each sector has a user data area of 2048 bytes with a logical sector length of 2048 bytes. File management is performed by a UDF file system of the host system.

In this semiconductor storage device, the memory unit is preferably formatted in accordance with the universal disk format (UDF) used for optical disk devices, and files are managed by a file system of the host system in accordance with the universal disk format (UDF). Thus, it is possible to provide semiconductor storage devices of various types such as the read-only type, the write-once type, and the rewritable type that can be used by the host system using the same command set or the same interface as the command set or the interface used for optical disk devices. Compared with the conventional semiconductor storage device managed by the FAT file system, it is possible to prevent one or more particular memory areas from being rewritten or erased a significantly greater number of times than the other memory areas, and thus it is possible to realize a semiconductor storage device of the rewritable type having a long life. Furthermore, it also becomes possible to realize a semiconductor storage device of the write-once type, which is not supported by a conventional FAT file system. The host system can access the semiconductor storage device by using the same interface, file system, and software resources as those used for the optical disk device without needing any modification.

According to a second aspect, the present invention also provides a semiconductor storage device based on the first aspect, wherein the memory unit includes the memory area and a management area, and the property information is stored in the management area or the control unit.

In the semiconductor storage device of the second aspect, the property information is allowed to be stored in the management area or the control unit. This makes it possible to easily write, in a highly reliable fashion, the property information when the semiconductor storage device is shipped from a factory to prevent the property information from being deleted by mistake.

According to a third aspect, the present invention provides a semiconductor storage device based on the second aspect, wherein the control unit interprets a property change command issued by the host system and changes the property information in accordance with the interpretation of the property change command.

In the semiconductor storage device of the third aspect, the property information can be changed in accordance with a command issued by the host system. This allows the single semiconductor storage device to be used as a semiconductor storage device whose type is switchable among a plurality of types.

As a fourth aspect, the present invention also provides a semiconductor storage device based on the first aspect, wherein the host system is one of a digital video camera, a digital camera, a digital video player, a digital audio player, a portable information terminal, or a portable telephone.

The semiconductor storage device according to the fourth aspect can be used by a host system of various types such as a digital video camera, a digital camera, a digital video player, a digital audio player, a portable information terminal, or a portable telephone.

In a fifth aspect of the invention, a semiconductor storage device usable by a host system has a particular operating system, a UDF file system, a CD/DVD class driver, and a particular hardware interface. The semiconductor storage device is used in a state in which the semiconductor storage device is loaded on a card reader/writer including an optical disk command interpreter for interpreting an optical disk command issued by the CD/DVD class driver. A memory interface performs data communication with a memory. A memory interface controller controls the memory interface and issues a command to the semiconductor storage device in response to a request from the optical disk command interpreter and in accordance with a memory interface protocol. The semiconductor storage device includes a memory unit having a memory area with a minimum predetermined memory capacity and a control unit for (1) interpreting a command issued by the memory interface controller via the memory interface and (2) controlling the memory unit so as to execute the command. Property information about the semiconductor storage device is stored in the memory unit or the control unit includes information indicating the type of the semiconductor storage device, such as a read-only type, a write-once type, or a rewritable type. The control unit interprets a property read command issued by the host system via the card reader/writer, executes the command, and returns the property information to the host system. In any device type, the memory area is formatted in accordance with the universal disk format (UDF) such that each sector has a user data area of 2048 bytes with a logical sector length of 2048 bytes, and file management is performed by a UDF file system of the host system.

In the semiconductor storage device of the fifth aspect, the memory unit is formatted in accordance with the universal disk format (UDF) used for optical disk devices, and files are managed by a file system of the host system in accordance with the universal disk format (UDF). Thus, it is possible to provide semiconductor storage devices of various types such as the read-only type, the write-once type, and the rewritable type that can be used by the host system using the same command set or the same interface as the command set or the interface used for optical disk devices. Compared with the conventional semiconductor storage device managed by the FAT file system, it is possible to prevent one or more particular memory areas from being rewritten or erased a significantly greater number of times than the other memory areas, and thus it is possible to realize a semiconductor storage device of the rewritable type having a long life. Furthermore, it also becomes possible to realize a semiconductor storage device of the write-once type, which is not supported by the conventional FAT file system. The host system can access the semiconductor storage device via the card reader/writer by using the same interface, file system, and software resources as those used for the optical disk device without needing any modification.

A sixth aspect of the present invention provides a semiconductor storage device based on the fifth aspect, wherein the optical disk command issued by the CD/CVD class driver is one of the commands included in an MNC (Multimedia Command) set.

The semiconductor storage device according to the sixth aspect can be used by using the same commands as the MMC commands used for optical disk devices typified by a DVD.

A seventh aspect of the present invention provides a semiconductor storage device based on the sixth aspect, wherein the property read command issued by the host system is an MMC vendor command, and the control unit of the semiconductor storage device interprets the vendor command, reads the property information form the control unit or the memory unit, and returns the property information to the host system.

In the semiconductor storage device according to the seventh aspect, the property information can be read only when the MMC vendor command is issued by the host system.

An eighth aspect of the present invention provides a semiconductor storage device based on the first or the fifth aspects, wherein the semiconductor storage device is of the write-once type. Information indicating that the semiconductor storage device is of the write-once type is stored as the information indicating the device type, in the memory unit or the control unit, and writing of data into each physical block is allowed only once.

The eighth aspect makes it possible to achieve a semiconductor storage device of the write-once type in which writing of data into each physical block is allowed only once.

A ninth aspect of the present invention provides a semiconductor storage device based on the first or fifth aspects, wherein the semiconductor storage device is of the write-once type. Information indicating that the semiconductor storage device is of the write-once type is stored as the information indicating the device type in the memory unit or the control unit. The number of times that formatting can be performed is set to be smaller than the number of times the semiconductor storage device can be rewritten/erased.

In the semiconductor storage device according to the ninth aspect, writing of data into physical blocks is allowed only once for each physical block. Furthermore, the semiconductor storage device can be formatted into the form of a blank medium unless the number of times formatting can be performed is equal to 0, such that the semiconductor storage device can be again used as a semiconductor storage device of the write-once type that allows data to be written in a highly-reliable manner.

A tenth aspect of the present invention provides a semiconductor storage device based on the first or fifth aspect, wherein the semiconductor storage device of the read-only type includes a mask ROM, an OTP, or a flash memory. The semiconductor storage device of the write-once type includes an OTP or a flash memory, and the semiconductor storage device of the write-once type includes a flash memory.

The tenth aspect provides a semiconductor storage device of the read-only type including a mask ROM, an OTP, or a flash memory, a semiconductor storage device of the write-once type including an OTP or a flash memory, and a semiconductor storage device of the write-once type including a flash memory.

An eleventh aspect of the present invention concerns a semiconductor storage device based on the first and fifth aspects, wherein the semiconductor storage device is of the read-only type, the write-once type, or the rewritable type including a flash memory.

The eleventh aspect provides semiconductor storage devices of various types such as the read-only type, the write-once type, and the rewritable type including a flash memory, that is, a semiconductor memory with the same structure.

A twelfth aspect of the present invention provides a semiconductor storage device based on the first or fifth aspects, wherein the control unit includes a controller that is adapted to handle functions of the semiconductor storage device, depending on whether the semiconductor storage device is of the read-only type, the write-once type, or the rewritable type.

The twelfth aspect makes it possible to provide low cost semiconductor storage devices of the read-only type and the write-once type.

A thirteenth aspect of the present invention provides a write-once type semiconductor storage device based on the first, fifth or eleventh aspects, wherein the semiconductor storage device has a plurality of models, each having a different memory capacity and/or writing speed.

The thirteenth aspect can provide write-once type semiconductor storage devices having a plurality of models, each having a different memory capacity and/or writing speed.

A fourteenth aspect of the present invention provides a semiconductor storage device comprising a memory unit having a memory area with a predetermined minimum memory capacity and a control unit for (1) interpreting a command issued by a host system and (2) controlling the memory unit in accordance with the command. The memory area is formatted in accordance with the universal disk format (UDF) such that each sector has a user data area of 2048 bytes with a logical sector length of 2048 bytes, and file management is performed by a UDF file system of the host system.

In the semiconductor storage device of the fourteenth aspect, the memory unit is formatted in accordance with the universal disk format (UDF) used for optical disk devices, and files are managed by a file system of the host system in accordance with the universal disk format (UDF). Thus, it is possible to provide semiconductor storage devices of various types such as the read-only type, the write-once type, and the rewritable type that can be used by the host system using the same command set or the same interface as the command set or the interface used for optical disk devices. Compared with the conventional semiconductor storage devices managed by the FAT file system, it is possible to prevent one or more particular memory areas from being rewritten or erased a significantly greater number of times than the other memory areas, and thus it is possible to realize a semiconductor storage device of the rewritable type having a long life. Furthermore, it also becomes possible to realize a semiconductor storage device of the write-once type, which is not supported by the conventional FAT file system.

According to the present invention, it is possible to provide various types of semiconductor storage devices, without modification, such as the read-only type, the write-once type, and the rewritable type, that can be used by a host system using an existing command set and an existing interface. It is also possible to provide a semiconductor storage device of the rewritable type in which intensive writing or erasing of data in one or more particular memory areas is prevented, thereby achieving a long life. It is also possible to provide a very convenient semiconductor storage device of the write-once type that can be initialized when the memory capacity becomes full such that writing of data is again allowed until a blank memory area created by initialization becomes full.

BRIEF DESCRIPTION OF THE DRAWINGS

FIG. 1 is a diagram of an exemplary structure of a first semiconductor storage device.

FIG. 2 is a diagram of an exemplary structure of a second semiconductor storage device.

FIG. 3 is a general diagram of a semiconductor storage device according to a preferred embodiment of the present invention.

FIG. 4 is a hardware block diagram of a system in which a semiconductor storage device according to a preferred embodiment of the present invention is used in combination with a card reader/writer.

FIG. 5 is a flow chart of a process performed on a medium in response to a read command issued by the host computer of FIG. 4.

FIG. 6 is a flow chart of a process performed on a medium in response to a write command issued by the host computer of FIG. 4.

FIG. 7 is a flow chart of a process performed on a medium in response to a format command issued by the host computer of FIG. 4.

FIG. 8 is a hardware block diagram of a system in which a semiconductor storage device according to a preferred embodiment the present invention is used in a state in which the semiconductor storage device is directly loaded on a host computer of FIG. 4.

DETAILED DESCRIPTION OF THE DRAWINGS

Exemplary structures of a semiconductor storage device are initially described. The exemplary structures described below are for a card-type memory.

The semiconductor storage device includes a memory and a controller for controlling the memory in accordance with a command received from a host system.

FIG. 1 is a schematic diagram of a semiconductor storage device structure including a memory and a controller constructed in the form of separate IC chips 11 and 12, respectively. IC ships 11 and 12 are disposed on a single printed circuit board (not shown) and are housed in a case 13. Case 13 has a card-shaped external appearance so as to function as a card-type memory 1 as a whole. The memory IC chip 11 is, for example, a nonvolatile flash memory. The flash memory is one type of EEPROM, and various configurations such as NAND, AND, and OR configurations are available. The card-type memory is used in a state in which it is directly attached to a host system via a memory interface.

FIG. 2 is a schematic diagram of another exemplary semiconductor storage device structure. In this example, as shown in FIG. 2(A), a memory integrated circuit and a controller integrated circuit are located in the same plane on the same IC chip 14. The IC chip 14 is disposed on a printed circuit board (not shown) and housed in a case 15 having a card-shaped external appearance so as to function as a card-type memory 10 as a whole. Instead of disposing the circuits in the same plane in the IC chip 14, the circuits can be disposed in different layers of a multi-layer structure. The layered structure provides an increase in memory capacity.

In the examples of card-type memories 1 and 10 shown in FIG. 1 or 2, a connector (a hole part) for connection with a host system is disposed on the side of the case 13 or 15. Alternatively, terminal electrodes for connection with a host system can be disposed on the upper surface of the case 13 or 15.

Each of those card-type memories 1 and 10 can be directly loaded on a host system, if the host system has a memory interface and a slot in which the card-type memory 1 or 10 is inserted.

In a case in which the host system does not have a memory interface or a card slot, the card-type memory 1 or 10 can be used in a state in which the card-type memory 1 or 10 is loaded on a card reader/writer 2 as shown in FIG. 3(A). The card reader/writer 2 is connected to the host system via a particular host interface such as a USB interface or an IEEE1394 interface. When the USB interface or the IEEE1394 interface is used, the card reader/writer 2 is connected to the host system via a cable.

When the host system has a PCMCIA slot, the card-type memory 1 or 10 can be used in a sate in which the card-type memory 1 or 10 is inserted in a PCMCIA adapter 3 directly connected to the host system, as shown in FIG. 3(B).

Each of card reader/writer 2 and the PCMICA adapter 3 has a controller for controlling communication between a host system and the card-type memory 1 or 10.

When a host interface is provided in a host system, as with an ATA or SATA interface, a card reader/writer is disposed in the inside of the host system such that the card-type memory 1 or 10 can be inserted into a slot having an open end exposed to the outside.

Features of the semiconductor storage device according to the present invention and examples of applications thereof are described.

A feature of the semiconductor storage device is that the semiconductor storage device can be set to be one of three types: a read-only type; a write-once type; and a rewritable type. In any device type, the memory area is formatted in accordance with the universal disk format (UDF) such that each sector has a user data area of 2048 bytes with a logical sector length of 2048 bytes, and the memory area of the memory unit is managed by a UDF file system of a host system.

In conventional semiconductor storage devices using a flash memory, only the rewritable type is available, and there are no available blank memory semiconductor storage devices of the read-only type or the write-once type. In this document, a rewritable type device is a device that allows data to be rewritten in each physical block up to a predetermined number of times. The term "medium" is also used in the following description to express the memory or the memory unit of the semiconductor storage device.

The medium is described in further detail below for each medium type.

A medium of the read-only type refers to a medium that only allows data to be read from its user data area and does not allow data to be either written into or deleted from the user data area. Furthermore, it is not possible to format the user data area of a read only medium. The read-only type medium can be realized by using, for example, a mask RON, an OTP (One Time Program) RON (in which data can be written only once), or a nonvolatile memory such as a flash memory. When the read-only medium receives a data write command or a data delete command from a host system, the medium returns a command status message indicating that an error has occurred. The error informs the host system that the medium is of the read-only type and the command cannot be executed. When the read-only medium receives a data read command from the host system, the medium reads data with a length specified by the command stored at a logical block address specified by the command and transfers the read data to the host system.

In a write-once medium, writing of data into logical blocks of a user data area is basically allowed only once for each logical block. In the write-once type of medium, logical blocks can be permanently related to corresponding physical blocks. That is, writing of data is allowed only when free memory space is available, such that data is written into physical blocks in which no data is yet written. The data are written until the memory space becomes full. In other words, overwriting of data in any physical block does not occur. The write-once medium type can be realized by using a nonvolatile memory, such as an OTP memory or a flash memory, capable of writing data at least once. Reading of data from the write-once medium is possible in a similar manner to the read-only type medium.

When a rewritable non-volatile memory, such as a flash memory is used, if the number of times the memory is allowed to be further formatted is not 0, the user data area can be initialized and the resultant medium can be re-used as a medium having a writable blank area. The present invention has an advantage that the medium can be set such that writing is allowed to be performed a plurality of times within a predetermined limit. In this document, the word "limit" refers to the maximum number of times the medium can be formatted into the form of a blank medium into which writing of data is allowed (as will be described in further detail later). The "limit" is set to be smaller than a predicted maximum number of times rewriting of data into each physical block can be performed. The reason why the upper limit of the number of times rewriting can be performed is set to be smaller than the predicted maximum number of times rewriting of data in the medium is allowed is to ensure that data can be written in a highly reliable manner without fail.

In response to a device of the write-once type receiving a data write command from a host system, data with a length specified by the command is received from the host system and written at a logical block address specified by the command.

The file system manages files such that the host system does not issue a write command to write data at a logical block in which data has already been written. However, if the host system issues a write command to write data at a logical block in which data has already been written, an error message is returned as a command status message and the write command is rejected. In the case of the write-once type, the process of rewriting data in a physical block is unnecessary, and the control unit does not need to perform complicated processing associated with rewriting. This makes it possible to provide a memory at low cost. Thus, the medium of the write-once type is suitable for use as an archive memory for archiving data such as picture data of, for example, a wedding ceremony, for a particular period of time. Various memories that are different in memory capacity (the number of pictures that can be stored) or storage speed may be provided so that users can select a desired one from many choices.

A rewritable medium is a medium that allows data to be randomly written in its user data area. The rewritable medium can be realized by using a non-volatile memory, such as a flash memory capable of writing data many times within a predetermined limit. In response to the medium of the rewritable type receiving a data write command from a host system, data with a length specified by the command is received from the host system and written at a logical block address specified by the command. The medium of the rewritable medium allows data to be read randomly, as with the medium of the read-only type. In the case of a flash memory being used, rewriting of data in physical blocks in a user data area can be performed many times within a predetermined limit. Unlike the medium of the write-once type, it is not necessary to perform initialization each time rewriting is performed, although initialization of the medium is possible as required.

Another feature of the present semiconductor storage device is that properties specific to each device are stored as property information in the device. In addition to the medium type, the property information can include information about the properties described in Table 1 shown below. The property information can be stored in the control unit or a management area of the memory unit of the device, for example, when the device is shipped from a factory. As described later, the property information is stored in an area such that the property information can be read in response to a specific command issued by a host system.

TABLE 1

| <Property Information> | <Contents> |
| --- | --- |
| Medium Type | "Read-Only Type", "Write-Once Type", or "Rewritable Type" |
| Medium Type Changeability | "Yes" or "No" |
| Write Protection | "On" or "Off" |

TABLE 1-continued

| <Property Information> | <Contents> |
| --- | --- |
| Format Status | "Formatted" or "Unformatted" |
| Number of Times Formatting is Allowed to be Further Performed | "N" |

Each property of Table 1 is described below.

In the "medium type" field, information indicating the type of device is written. The device type can be one of the three types, the read-only type, the write-once type, and the rewritable type. If "medium type changeability" described below is yes, the property information regarding the medium type can be changed.

The "medium type changeability" property is a flag indicating whether the medium type can be changed by a command. For example, in order to use a device in a state in which the medium type is fixed to a write-once type, the "medium type" is set to the write-once type and the "medium type changeability" is set to be "no". The "medium type" can be changed or the setting of the "medium type changeability" can be changed to "yes" in response to a command issued by a user whose authorization is verified by a password or the like.

The "write protection" property indicates whether writing of data into a medium is enabled or disabled when the medium is set to be of the rewritable type or the write-once type. When the "write protection" is set to be on, if a write command is received from a host system, an error message is returned to the host system and writing of data into the medium is not allowed. The property regarding the "write protection" can be changed by a user.

The "medium format status" property indicates whether or not a medium has been physically formatted. That is, the "medium format status" property is a flag indicating whether accessing the medium to read or write data from or to the medium is possible.

The "allowable number of times formatting is further performed" property indicates the allowable number (N) of times a medium can be initialized in response to a format command. When N=0, formatting is no longer allowed. For example, if properties of a medium are set such that the medium type is write-once type and the allowable number of times further formatting can be performed is "0", the medium is of the type that allows data to be written such that the written data is added to existing data (without rewriting physical blocks) until the memory space becomes full. When the medium is the write-once type and the "allowable number of times formatting is further performed" is "2", the medium is of the type that allows written data to be added to existing data until the memory space becomes full and that allows formatting to be performed up to twice to initialize the medium into the form of a blank medium that can be used again in the add-to-existing manner until an available memory space created by the initialization becomes full. N is decremented by "1" each time formatting is performed. When N becomes 0, no further formatting is allowed.

FIG. 4 is a block diagram of a system in which a semiconductor storage device is used by a host system via a card reader/writer. In the following description, a semiconductor storage device of the read-only type, in the form of a card type memory in the present example, is denoted by reference symbol 1a, a card-type memory of the write-once type is denoted by reference symbol 1b, and a card-type memory of the rewritable type is denoted by reference symbol 1c. However, when it is not necessary to distinguish medium types from one another, a card-type memory is denoted generally by reference symbol 1.

A host computer 4 is used, by way of example, as the host system. The host computer 4 includes an OS (Operating system) 41, a UDF file system 42, a CD/DVD class driver 43, and a specific hardware interface 44.

The UDF file system 42 is a file system for use by an optical disk device and is suitable for dealing with large-size data such as video data. The CD/DVD class driver 43 is a device driver for issuing an MMC command to an optical disk device, as will be described later. The hardware interface 44 is, for example, a USB interface or a PCMCIA interface.

The card reader/writer 2 includes a hardware interface 21, a host interface controller 22, an MMC command interpreter 23, a memory interface controller 24, and a memory interface 25 for transmitting data to a medium.

The MMC command interpreter 23 interprets an MMC command received from a host system. MNC commands are commands for controlling optical disk devices typified by a DVD. The MNC commands include standard commands and vendor commands. Depending on a specific MMC command, the command does not involve accessing a medium. For commands that do not involve accessing a medium, entire processing is completed when processing performed by the MMC command interpreter 23 is completed. On the other hand, in response to a command needing access to a medium, the MMC command interpreter 23 requests the memory interface controller 24 to read data from the card-type memory 1, write data into the card-type memory 1, or initialize (format) the card-type memory 1.

In response to a write command being issued by the host computer 4, data transferred from the host computer 4 via the memory interface controller 24 and the memory interface 25 is written in the card-type memory 1. When a read command is issued, data is read from the card-type memory 1 and transferred to the host computer 4 via the host interface 22 and the hardware interface 21.

The memory interface controller 24 controls the memory interface 25 to transmit data between the card reader/writer 2 and the card-type memory 1. More specifically, the memory interface 24 controls the protocol and electrical timing of the memory interface 25 such that in response to a request from the MMC command interpreter 23 and in accordance with a memory interface protocol, a read command is issued to the card-type memory 1 to read data from the card-type memory 1 or a write command is issued to the card-type memory 1 to write data into the card-type memory 1.

The host interface controller 22 commands the hardware interface 21 to transmit data between the card reader/writer 2 and the host computer 4. More specifically, the host interface controller 22 controls the protocol and electrical timing of the hardware interface 21 such that, in accordance with a hardware interface protocol, data read from the card-type memory 1 is transferred to the host computer 4 or data received together with a write command from the host computer 4 is transferred to the card-type memory 1.

In the following description, it is assumed that the WINDOWS (registered trademark) system is used as the OS 41 of the host computer 4.

Referring to FIG. 4, there is illustrated an example in which a card reader/writer 2 is connected to a host computer 4 via a USB bus. The host computer 4 is assumed to be in an activated state. If the card reader/writer 2 is connected to the USB bus, electric power is supplied to the card reader/writer 2 via the USB bus, and the card reader/writer 2 is initialized.

If the OS 41 of the host computer 4 detects that some device is connected with the USB bus, the OS 41 issues a GET DESCRIPTOR command to acquire a product ID and a vendor ID.

Subsequently, the OS 41 issues a SET ADDRESS command thereby setting the address of the card reader/writer 2. Once the address of the card reader/writer 2 has been set, the card reader/writer 2 acquires only a frame addressed to this address. The OS 41 then issues a GET DESCRIPTOR command. In response to the GET DESCRIPTOR command, the card reader/writer 2 informs the host computer 4 that the card reader/writer 2 is a device of a mass storage class.

Subsequently, the OS 41 issues a SET CONFIGURATION command. In response, the card reader/writer 2 sets CONFIGURATED STATE to make it possible to receive SCSI commands.

In response, the host computer 4 activates a USB mass storage class driver that is one type of port driver, and the USB mass storage class driver is loaded in a RAM (not shown) such that it functions as a part of the OS.

The OS 41 then issues, to the card reader/writer 2, an INQUIRY command, which is an SCSI command. In response, the card reader/writer 2 informs the host computer 4 of the device type of the card reader/writer 2, that is, informs that the card reader/writer 2 is an optical disk device. Actually, the card reader/writer 2 is not an optical disk device, but information generated by the card reader/writer 2 causes the host computer 4 to regard the card reader/writer 2 as an optical disk device.

Subsequently, the OS 41 activates the CD/DVD class driver (hereinafter, referred to simply as a class driver) 43 serving as a function driver of an MMC command device. MMC commands are commands for controlling an optical disk such as a CD or a DVD.

Subsequently, the class driver 43 issues a GET CONFIGURATION command to the card reader/writer 2. In response, the card reader/writer 2 sends information indicating properties (in terms of, for example, the medium type supported by the card reader/writer 2) specific to the card reader/writer 2 to the class driver 43. At this point of time, a drive letter is assigned and an icon labeled with the assigned drive letter appears on a monitor of the computer to indicate there is an optical disk device assigned, for example, as a D drive.

The class driver 43 issues a GET EVENT STATUS/NOTIFICATION command periodically at predetermined intervals. If the card-type memory 1 is loaded on the card reader/writer 2, information indicating that the card-type memory 1 is loaded on the card reader/writer 2 is sent to the card reader/writer 2.

In response to the card-type memory 1 being loaded on the card reader/writer 2, electric power is supplied to the card-type memory 1, and initialization is performed in the card-type memory 1. During the initialization, management information is read from the management area of the memory. The limitation also causes a logical block address/physical block address management table, a bad block table, and a free block table to be produced in the control unit of the memory. Completion of the initialization causes the card-type memory 1 to be brought into a ready state in which the card-type memory 1 can accept a command from the card reader/writer 2 via the memory interface 25. After the card-type memory 1 is brought into the ready state, the card reader/writer 2 issues a command via the memory interface 24 to acquire property information. The acquired property information is stored in the card reader/writer 2.

As described above, the class driver 43 issues the GET EVENT STATUS/NOTIFICATION command periodically at predetermined intervals. Thus, when a new medium is loaded on the card reader/writer 2, the host computer 4 is informed that the new medium is loaded.

In response to the class driver 43 subsequently issuing the GET CONFIGURATION command, the following are sent to the class driver 43: (1) the property information of the card-type memory 1 in terms of the medium type, (2) the medium type changeability, (3) the enabled/disabled status of the write protection, (4) the medium formatting status, (5) the allowable number of times further formatting is performed, and (6) information indicating the total number of logical blocks and the logical block size. This is possible because in response to the card-type memory 1 being loaded on the card reader/writer 2, the card reader/writer 2 acquires the property information from the card-type memory 1 and stores the acquired property information.

The property information and the information associated with the total number of blocks and the logical block size can be stored in the control unit of the card-type memory 1, and the information can be read in response to the OS 41 issuing from the class driver 43 a vendor unique command, which is one of the MMC commands.

In response to the property information in terms of the medium type indicating that the card-type memory 1 is of the write-once type, the class driver 43 determines, from the number of times formatting is allowed to be further performed, whether writing is allowed only once or initialization of the card-type memory 1 into an initial state is allowed and thus whether further writing after initialization can be performed. If the property information indicates the card-type memory 1 is of the read-only type, the class driver 43 recognizes that only random-access reading is allowed. If the property information indicates the card-type memory 1 is of the rewritable type, the class driver 43 recognizes that both random-access reading and random-access writing are allowed.

Subsequently, the class driver 43 issues a READ CAPACITY command to read the total number of blocks and the logical block size of the medium from the card reader/writer 2, and the class driver 43 sends the read information to the OS 41. The class driver 43 then issues a READ TOC command to acquire the number of sessions existing on the medium and the logical block address of a session written last.

Thereafter, the OS 41 activates the UDF file system 42 and reads a particular logical block address of the medium. For example, the UDF file system 42 reads a volume identification string stored in a sector 16 to determine whether the medium is managed according to the scheme of the UDF file system.

If the UDF file system determines that the medium is managed according to the scheme of the UDF file system, the class driver 43 loads a UDF volume on a registered device object (in this specific case, the card-type memory 1 loaded on the card reader/writer 2). In the above process of loading the UDF volume, to read the volume structure, the UDF file system requests the class driver to read data associated with the volume structure stored at a particular logical block address.

The volume refers to a virtual disk on which the UDF file system is placed. Loading refers to placing a file system on a directory tree of the WINDOWS (registered trademark) so that data in the UDF file system can be accessed (for further detailed information, refer to the specifications of the UDF).

After completion of the above-described process of activating the card reader/writer 2, it becomes possible for the host computer 4 to access the medium.

That is, in accordance with a command issued by a user, the OS or an application issues a command to the UDF file system 42 to create/delete a file, read or write a file, or read a directory entry, depending on the medium type. In response to the command received from the OS 41, the UDF file system 42 converts logical data into physical medium data or converts physical medium data into logical data, in accordance with the command.

Physical medium data refers to read data or write data issued to the class driver 43. The physical medium data includes a logical block address of the medium and data to be written at the logical block address or the physical medium data includes a logical block address from which to read data. The control unit of the device (1) converts the logical block address into a physical block address by referring to the "logical block address/physical block address management table", and (2) writes or reads data into or from a memory area specified by the resultant physical block address.

The class driver 43 converts a read command or a write command received from the UDF file system 42 into an MMC command of READ(10) or WRITE(10) and issues the resultant MMC command to the card reader/writer 2.

When semiconductor storage devices of the read-only type, the write-once type, and the rewritable type are formed from a semiconductor memory with the same structure (for example, a flash memory), processing is performed on each medium in response to a read command, write command, or a format command issued by a host system, as described below with reference to the drawings. The flow of the process described herein is the same as the flow of a process that is described infra in "(2) Process Performed When Medium is Used Directly by Host System". The process can be performed by the control unit of the device. In the case in which the card reader/writer 2 is used, some part of the process such as detection of whether write protection is enabled or disabled or detection of the medium type, can be performed by the card reader/writer 2.

1. Process Performed in Response to Read Command

The process performed by the control unit of the medium in response to the control unit receiving the read command is described below with reference to FIG. 5.

First, the control unit determines whether the medium has been formatted. If the medium is unformatted (that is, if the answer to step ST101 is no), an error message is returned. On the other hand, if the answer to step ST101 is yes, reading is performed (ST102).

In any medium type, in response to the read command being received, data with a length corresponding to a specified number of logical blocks is read from the specified logical blocks and transferred via the memory interface 25. If reading is unsuccessful (that is, if the answer to step ST103 is no), the process is abnormally ended. If reading is successful, the process is normally ended (ST104).

2. Process Performed in Response to Write Command

The process performed by the control unit of the medium in response to receiving the write command is described below with reference to FIG. 6.

First, the control unit of the mechanism determines whether the medium has been formatted (step ST201). If the medium is unformatted (that is, if the answer to step ST201 is no), the process is abnormally ended. On the other hand, if the answer to step ST201 is yes, the control unit determines whether the write protection is enabled (ST202). If yes, the process is abnormally ended. On the other hand, if the write protection is disabled (that is, if the answer to step ST202 is no), the control unit determines whether the medium type is the read-only type (ST203). If yes, the process is abnormally ended.

In the case in which the answer to step ST203 is no, the control unit determines whether the medium type is the write-once type (ST204). If yes, a further determination is made as to whether a logical block specified by the write command has already been written (ST205). If yes, the process is abnormally ended. If the result in step ST204 is no (that is, if the medium type is the rewritable type) or if the result in step ST205 is yes, specified data is written in a specified logical block of the medium (ST206), and a determination is made as to whether the data has been successfully written (ST207). If no, the process is abnormally ended. If the data has been successfully written, the process is normally ended (ST208).

3. Process Performed in Response to Format Command

The process performed by the control unit of the medium in response to receiving the format command is described below with reference to FIG. 7.

The control unit initially determines whether the write protection is enabled (ST301). If yes, the process is abnormally ended. However, if no, it is further determined whether the medium type is the read-only type (ST302). If yes, the process is abnormally ended. If no (that is, if the medium type is the rewritable type or the write-once type), a determination is made as to whether the number, N, of times formatting is allowed to be further performed is equal to 0 (ST303). If yes, the process is abnormally ended. If no, the control unit sets the format status flag to an "unformatted" state (ST304). (If the format status flag is already set in the "unformatted" state, the format status flag is maintained). Subsequently, formatting is performed (ST305). Furthermore, the number of times further formatting is allowed to be performed is decremented by 1 (ST306). A determination is then made as to whether formatting has been successfully performed (ST307). If no, the process is abnormally ended. If yes, the format status flag is set to the "formatted" state (ST308). Thus, the process of the format command is completed.

In the above-described process, the format status flag is set to the "unformatted" state (ST304) before formatting is performed in step ST305 to enable formatting to be performed again if the formatting in step ST305 fails for some reason and the process is abnormally ended (i.e., no in step ST307).

In any medium type except for the read-only type, as described above, if the property information indicates formatting is allowed, the medium is initialized (i.e., all stored files are deleted) in response to receipt of the format command. When the medium is of the write-once type, the initialization performed in respnse to the format command causes the medium to be brought into a state in which any logical block address is allowed to be written. If the number of times further formatting is allowed to be performed becomes "0", further formatting becomes impossible, and the medium is in a final state, enabling the medium to be used as the write-once type. When data has been written in all the memory areas or when finalizing is performed, it becomes impossible to further write data. When the medium type is the write-once type, if a finalize command is received, further writing is disabled, and the medium is dealt with as a medium of the read-only type. In any medium type other than the write-once type, if the finalize command is received, an error message is returned.

The class driver 43 checks whether a medium ejection request is issued periodically at predetermined intervals by issuing the GET EVENT STATUS/NOTIFICATION command or the TEST UNIT READY command. More specifically, ejection of the medium by pressing a button is disabled by class timer 43 issuing a PREVENT ALLOW/MEDIA REMOVAL command, and the event of pressing the button is detected by issuing the GET EVENT STATUS/NOTIFICATION command.

If pressing of the button is detected, the class driver 43 requests the OS to flush a cache. In response to the cache being flushed, the class driver 43 issues a START/STOP UNIT command to cause the medium to be ejected from the card reader/writer 2 (for example, an LED disposed on the medium is turned off to notify a user that the medium is enabled to be ejected). Furthermore, the UDF volume is unloaded from the device object to which the class driver is assigned.

Although the examples described above use the WINDOWS (registered trademark) system as the OS and the USB interface as the host interface, other operating systems or other host interfaces can be used.

(2) Process Performed When Medium is Used Directly by Host System

FIG. 8 is a block diagram of an apparatus for enabling the semiconductor storage device according to the present invention to be used in a semiconductor storage device that is directly loaded on a host system.

The host system 5 includes a particular OS 51, a UDF file system 52, a memory interface controller 53, and a memory interface 54. In this example, the host system 5 does not need to have a CD/DVD class driver and does not issue MMC commands. However, the host system 5 needs to have a memory interface controller and a memory interface similar to those disposed in the card reader/writer in the system of FIG. 4. In the system of FIG. 8, the UDF file system 52 of the host system 5 issues a command to the memory interface controller 53. In response to this command, the memory interface controller 53 issues a command to the control unit of the medium thereby managing files of the medium.

Specific examples of the host system 5 include a digital video camera, a digital camera, a digital video player, a digital audio player, a portable information terminal, and a portable telephone. It is necessary for the electrical and mechanical connection structure of the memory interface to be consistent between the host system and the card-type memory.

If the medium is loaded on the host system 5, the memory interface controller 53 issues a medium information acquisition command to acquire the medium type (the read-only type, the write-once type, or the rewritable type) of the medium and the total number of the blocks and the logical block size of the medium.

Thereafter, the OS 51 activates the UDF file system 52 and loads a UDF volume on the medium. If the medium is based on a file system other than the UDF file system, an error message is issued. If the medium is unformatted, the user is supplied with a notification indicating that logical formatting of the medium is needed.

If it is confirmed that the UDF file system is loaded, then in accordance with a command issued by a user, the OS or an application issues a command to the UDF file system 52 to create/delete a file, read or write a file, or read a directory entry. In response to the command received from the OS 51, the UDF file system 52 converts logical data into physical medium data or converts physical medium data into logical data, in accordance with the command. The physical medium data refers to read data or write data issued to the memory interface controller 53 from the UDF file system 52.

The physical medium data includes a logical block address of the medium and data to be written at the logical block address or the physical medium data includes a logical block address from which to read data. The control unit of the device converts the logical block address into a physical block address by referring to the "logical block address/physical block address management table", and writes or reads data into or from a specific memory area specified by the resultant physical block address.

More specifically, the memory interface 53 converts a read/write command received from the UDF file system 52 into a corresponding memory command and transfers the resultant command to the card-type memory 1. In a case in which a medium ejection signal is generated, when the OS 51 becomes ready for ejection of the medium, the OS 51 unloads the UDF volume from the medium.

In the above description, the card-type memory is used as the semiconductor storage device by way of example, the semiconductor storage device is not limited to the card-type memory. It is desirable that the control unit of the semiconductor storage device be constructed in an adaptively optimized form depending on whether the semiconductor storage device is of the read-only type, the write-once type, or the rewritable type. For example, in the semiconductor storage device of the read-only type, the control unit needs only to perform writing of contents before the semiconductor storage device is shipped and perform reading of the contents after the semiconductor storage deice is sold to a user. In the case of the write-once type, rewriting of physical blocks is not necessary. Thus, the controller dedicated to the read-only type or the write-once type can be constructed at lower cost than the general-purpose controller for use for the rewritable type. This provides enhanced convenience to users.

A summary of the reference numerals is:

1, 1a, 1b, 1c, 10: card-type memory (semiconductor storage device); 2: card reader/writer; 3: PCMCIA adapter; 4: host computer; 5: host system; 11: memory; 12: controller (control unit); 13, 15: case; 14: IC chip; 21, 44: hardware interface; 22: host interface controller; 23: MMC command interpreter; 24, 53: memory interface controller; 25, 54: memory interface; 41, 51: OS; 42, 52: UDF file system; 43: CD/DVD class driver.

The invention claimed is:

1. A semiconductor storage device usable by a host system having a particular operating system, a UDF file system, a memory interface controller, and a memory interface, the semiconductor storage device including:
 a memory unit having a memory area with at least a predetermined memory capacity and a control unit for interpreting a command issued by the host system and controlling the memory unit in accordance with the command, the semiconductor storage device storing property information indicating device type of the semiconductor storage device;
 the control unit being arranged for (a) interpreting a property information read command issued by the host system, (b) executing the command, and (c) returning the property information to the host system; and
 the memory area being formatted in accordance with the universal disk format (UDF) such that each sector has a user data area of 2048 bytes with a logical sector length of 2048 bytes.

2. The device of claim 1 in combination with the host system, the host system being arranged to perform file management of files stored in the semiconductor storage device by a UDF file system.

3. The device of claim 1, wherein the memory unit is arranged to store the indication of device type.

4. The device of claim 1, wherein the control unit is arranged to store the indication of device type.

5. A semiconductor storage device according to claim 1, wherein the memory unit includes the memory area and a management area, and the property information is stored in the management area of the memory unit.

6. A semiconductor storage device according to claim 5, wherein the control unit is arranged to (a) interpret a property information change command issued by the host system and (b) change the property information in accordance with the interpretation of the property change command.

7. A semiconductor storage device according to claim 1, wherein the host system comprises one of a digital video camera, a digital camera, a digital video player, a digital audio player, a portable information terminal, and a portable telephone.

8. A semiconductor storage device according to claim 1, wherein the semiconductor storage device is of the write-once type, the memory unit or the control unit being arranged to store information indicating that the semiconductor storage device is of the write-once type, and the device being arranged so writing of data into each physical block is allowed only once.

9. A semiconductor storage device according to claim 1, wherein the semiconductor storage device is of the write-once type, the memory unit or the control unit being arranged for storing information indicating that the semiconductor storage device is of the write-once type is stored, the device being arranged so the number of times formatting is allowed to be further performed is smaller than the number of times the semiconductor storage device can be rewritten/erased.

10. A semiconductor storage device according to claim 1, wherein the semiconductor storage device is of the read-only type includes a mask ROM, an One Time Programmable ROM (OTP ROM) in which the data are written, or a flash memory, the semiconductor storage device of the write-once type includes an OTP ROM in which the data are not written but are adapted to be written or a flash memory, and the semiconductor storage device of the rewritable type includes a flash memory.

11. A semiconductor storage device according to claim 1, wherein the semiconductor storage device includes a flash memory and is any of the read-only type, the write-once type, and the rewritable type.

12. A semiconductor storage device according to claim 1, wherein the control unit includes a controller adapted to function as the semiconductor storage device depending on whether the semiconductor storage device is of the read-only type, the write-once type, or the rewritable type.

13. A semiconductor storage device according to claim 1, wherein when the semiconductor storage device is of the write-once type, the semiconductor storage device including a plurality of models each having a different memory capacity and/or writing speed.

14. A semiconductor storage device according to claim 11, wherein when the semiconductor storage device is of the write-once type, the semiconductor storage device including a plurality of models each having a different memory capacity and/or writing speed.

15. In combination,
a semiconductor storage device usable by a host system having a particular operating system, a UDF file system, a CD/DVD class driver, and a particular hardware interface,
a card reader/writer carrying the semiconductor storage device, the card reader/writer including an optical disk command interpreter for interpreting an optical disk command issued by the CD/DVD class driver,
a memory interface for performing data communication with a memory; and
a memory interface controller for (a) controlling the memory interface and (b) issuing a command to the semiconductor storage device in response to a request from the optical disk command interpreter and in accordance with a memory interface protocol;
the semiconductor storage device including a memory unit having a memory area with at least a predetermined memory capacity and a control unit for (a) interpreting a command issued by the memory interface controller via the memory interface and (b) controlling the memory unit for executing the command, the semiconductor storage device storing property information indicating a device type of the semiconductor storage device;
the control unit being arranged to interpret a property read command issued by the host system via the card reader/writer, execute the command, and return the property information to the host system;
the memory area being formatted in accordance with the universal disk format (UDF), so each memory area sector has a user data area of 2048 bytes with a logical sector length of 2048 bytes.

16. The device of claim 15 in combination with the host system, the host system being arranged to perform file management of files stored in the semiconductor storage device by a UDF file system.

17. The device of claim 15, wherein the memory unit is arranged to store the indication of device type.

18. The device of claim 15, wherein the control unit is arranged to store the indication of device type.

19. A semiconductor storage device according to claim 15, wherein the CD/DVD class device is arranged to issue an optical disk command that is included in an MMC (Multimedia Command) set.

20. A semiconductor storage device according to claim 19, wherein the property read command arranged to be issued by the host system is an MMC vendor command, and the control unit of the semiconductor storage device is arranged to (a) interpret the MMC vendor command, (b) read the property information from the control unit or the memory unit, and (c) return the property information to the host system.

21. A semiconductor storage device according to claim 15, wherein the semiconductor storage device is of the write-once type, the memory unit or the control unit being arranged to store information indicating that the semiconductor storage device is of the write-once type, and the device being arranged so writing of data into each physical block is allowed only once.

22. A semiconductor storage device according to claim 15, wherein the semiconductor storage device is of the write-once type, the memory unit or the control unit being arranged for storing information indicating that the semiconductor storage device is of the write-once type, the device being arranged so the number of times formatting is allowed to be further performed is smaller than the number of times the semiconductor storage device can be rewritten/erased.

23. A semiconductor storage device according to claim 15, wherein the semiconductor storage device is of the read-only type includes a mask ROM, an OTP ROM in which the data are written, or a flash memory, the semiconductor storage device of the write-once type includes an OTP ROM in which the data are not written but are adapted to be written or a flash memory, and the semiconductor storage device of the rewritable type includes a flash memory.

24. A semiconductor storage device according to claim 15, wherein the semiconductor storage device includes a flash memory and is any of the read-only type, the write-once type, and the rewritable type.

25. A semiconductor storage device according to claim 15, wherein the control unit includes a controller adapted to function as the semiconductor storage device depending on whether the semiconductor storage device is of the read-only type, the write-once type, or the rewritable type.

26. A semiconductor storage device according to claim 15, wherein when the semiconductor storage device is of the write-once type, the semiconductor storage device including a plurality of models each having a different memory capacity and/or writing speed.

27. A semiconductor storage device comprising:
a memory unit having a memory area with at least a predetermined memory capacity; and
a control unit for (a) interpreting a command issued by a host system and (b) controlling the memory unit in accordance with the command,
the memory area being formatted in accordance with the universal disk format (UDF) such that each sector has a user data area of 2048 bytes with a logical sector length of 2048 bytes; and
the device being arranged so file management thereof can be performed by a UDF file system of the host system.

28. In combination, the semiconductor storage device of claim 27 and the host system, the storage device and the file system of claim 27 being arranged so the host system performs the file management.

29. A semiconductor storage device usable by a host system having a particular operating system, a UDF file system, a memory interface controller, and a memory interface, the semiconductor storage device including:
a memory unit having a memory area with at least a predetermined memory capacity and a control unit for interpreting a command issued by the host system and controlling the memory unit in accordance with the command, the semiconductor storage device storing property information indicating device type of the semiconductor storage device;
the control unit being arranged for (a) interpreting a property information read command issued by the host system, (b) executing the command, and (c) returning the property information to the host system; and
the memory area being formatted in accordance with the universal disk format (UDF) such that each sector has a user data area.

30. In combination,
a semiconductor storage device usable by a host system having a particular operating system, a UDF file system, a CD/DVD class driver, and a particular hardware interface, a card reader/writer carrying the semiconductor storage device, the card reader/writer including an optical disk command interpreter for interpreting an optical disk command issued by the CD/DVD class driver, a memory interface for performing data communication with a memory; and a memory interface controller for (a) controlling the memory interface and (b) issuing a command to the semiconductor storage device in response to a request from the optical disk command interpreter and in accordance with a memory interface protocol;

the semiconductor storage device including a memory unit having a memory area with at least a predetermined memory capacity and a control unit for (a) interpreting a command issued by the memory interface controller via the memory interface and (b) controlling the memory unit for executing the command, the semiconductor storage device storing property information indicating a device type of the semiconductor storage device;

the control unit being arranged to interpret a property read command issued by the host system via the card reader/writer, execute the command, and return the property information to the host system;

the memory area being formatted in accordance with the universal disk format (UDF), so each memory area sector has a user data area.

31. A semiconductor storage device comprising:

a memory unit having a memory area with at least a predetermined memory capacity; and a control unit for (a) interpreting a command issued by a host system and (b) controlling the memory unit in accordance with the command, the memory area being formatted in accordance with the universal disk format (UDF) such that each sector has a user data area; and the device being arranged so file management thereof can be performed by a UDF file system of the host system.

* * * * *